United States Patent [19]

Kanczuzewski

[11] Patent Number: 5,219,251
[45] Date of Patent: Jun. 15, 1993

[54] CARGO LOAD-LOCK

[76] Inventor: Ken Kanczuzewski, 17690 Fall Creek Dr., Granger, Ind. 46530

[21] Appl. No.: 957,516
[22] Filed: Oct. 6, 1992

Related U.S. Application Data

[63] Continuation of Ser. No. 674,686, Mar. 25, 1991, abandoned.

[51] Int. Cl.⁵ ............................................. B60P 7/15
[52] U.S. Cl. ..................................... 410/127; 410/145; 410/152
[58] Field of Search .................. 410/54, 94, 121, 122, 410/127, 129, 140, 143–149, 151–153; 248/205.1, 205.2, 205.3, 205.4; 211/123

[56] References Cited

U.S. PATENT DOCUMENTS

| | | | |
|---|---|---|---|
| 969,002 | 8/1910 | Teachout | 410/151 |
| 1,401,419 | 12/1921 | McNally | 410/129 |
| 1,951,660 | 3/1934 | Klaudt | 410/145 X |
| 2,124,082 | 7/1938 | Reifer | 410/152 |
| 2,414,160 | 1/1947 | Moon | 410/151 |
| 2,464,080 | 3/1949 | Hankins | 105/411 |
| 2,467,681 | 4/1949 | McKinney | 410/152 |
| 2,697,631 | 12/1954 | Miller | 410/140 |
| 2,752,864 | 7/1956 | McDougal, Sr. et al. | 410/130 |
| 2,766,704 | 10/1956 | McMahon | 410/151 |
| 2,912,939 | 11/1959 | Miner, Jr. et al. | 410/145 |
| 2,980,037 | 4/1961 | Elsner | 410/144 |
| 3,177,007 | 4/1965 | Oren | 410/121 |
| 3,344,750 | 10/1967 | Kostrewa | 410/127 |
| 3,559,591 | 2/1971 | Breen et al. | 410/127 |
| 3,590,746 | 7/1971 | Gibson | 410/127 |
| 3,712,663 | 1/1973 | Laven | 410/133 |
| 4,080,906 | 3/1978 | Brown | 410/130 |
| 4,264,251 | 4/1981 | Blatt | 410/100 |
| 4,278,376 | 7/1981 | Hunter | 410/130 |
| 4,396,325 | 8/1983 | Joice-Cavanagh | 410/129 |
| 4,432,678 | 2/1984 | Liebel | 410/151 |
| 4,498,824 | 2/1985 | Kinkle | 410/121 |
| 4,756,498 | 7/1988 | Frye | 248/205.3 |
| 4,830,558 | 5/1989 | Sweeney | 248/205.3 X |
| 4,846,610 | 7/1989 | Schoenleben | 410/96 |
| 4,880,342 | 11/1989 | Pradovic | 410/121 |
| 4,932,817 | 6/1990 | Mattare | 410/152 |
| 4,955,771 | 9/1990 | Bott | 410/94 |
| 4,962,903 | 10/1990 | Gary | 248/205.3 |
| 4,982,922 | 1/1991 | Krause | 248/221.4 X |
| 5,028,184 | 7/1991 | Krause | 410/143 |

FOREIGN PATENT DOCUMENTS 1209255 10/1970 United Kingdom .

OTHER PUBLICATIONS

Bones Securement System Brochure: Available Through Advanced Intermodal Systems, Box 3249, Clearwater Beach, Fla. 34630; (Note: Pub. Date unknown).

Freight Restraint Systems Brochure–Ty-Gard by Walnut Industries, Inc.

Airbags Reduce Damage, Materials, Labor and Loading Time Brochure, Shippers Paper Products Company.

Primary Examiner—Michael S. Huppert
Assistant Examiner—Stephen T. Gordon
Attorney, Agent, or Firm—Barnes & Thornburg

[57] ABSTRACT

A cargo load-lock is provided having a blocking member and a pair of braces. The cargo load-lock can be used to limit shifting of freight during shipping. In the first preferred embodiment, the blocking member is a rigid structure, such as a 2×4. The blocking member is secured to opposing trailer sidewalls by the two braces. A brace is positioned at opposite ends of the blocking member, and is then secured to the trailer. Each brace includes a base and a sleeve. The sleeve receives opposite ends of the blocking member. Opposite the sleeve, the base includes an adhesive which provides a bond between the brace and the sidewall. Once the braces are secured, the cargo load-lock is in place. No tools are required. To collapse the cargo loadlock, the blocking member is first removed. This can be accomplished by prying open a portion of the sleeve. This is facilitated by perforations which extend in a U-shaped design along the top of the sleeve. Once the sleeve is opened, the blocking member can be lifted from the brace. After the blocking member is removed, the brace can be peeled from the vehicle sidewalls. The brace can then be discarded, or collected and recycled.

7 Claims, 2 Drawing Sheets

CARGO LOAD-LOCK

This application is a continuation of application Ser. No. 07/674,686, filed Mar. 25, 1991 and now abandoned.

BACKGROUND AND SUMMARY OF THE INVENTION

The present invention relates generally to a new and novel load-lock. More particularly, the present invention relates to a disposable load restraint mechanism for limiting the shifting of cargo in a trailer.

Semi-trailers and other similar vehicles account for much of the transportation of all goods in this country. There is hardly a product which cannot be transported by a trailer. Commercial producers use semi-trailers, trains and other box-type vehicles to haul their products across town and across country. On a smaller scale, individuals use pick-up trucks and small trailers to move personal items.

Despite the many advantages, moving cargo in a trailer is not without its problems. For example, the cargo needed to be moved is rarely an exact fit with the trailer. Most trailers are cube-like in design, while the cargo may be of most any shape. Even when the cargo is placed in boxes, the boxes still often do not fit perfectly into the trailer. Loading of trailers is even more complicated by the fact that not all trailers are uniform in size. For example, semi-trailers can vary in width from 96 inches to 102 inches. Trailers can vary even more in length. An additional concern includes the amount of cargo being shipped. It is not often that the cubic dimensions of the load exactly equal the cubic dimensions of the trailer. In other words, the load may only partially fill the trailer. When a trailer cannot be fully loaded, or when the cargo being shipped is of unusual dimensions, shifting can occur during transportation. This is highly undesirable, especially when the items being shipped are fragile or perishable. Shifting of cargo can also occur when the cargo is being shipped on pallets.

Many items have been developed to limit or restrict the shifting of cargo in trailers. One such item is shown in the brochure "Air Bags Reduce Damage, Materials, Labor and Loading Time" by Shippers Paper Products Company. This brochure describes an inflatable air bag which can be wedged into voids in a loaded trailer. Once in place, the air bag is inflated, thus reducing the available space in the trailer. To inflate the air bag, a pressure gauge and source of high pressure air is required. This device is further limited in that it can be relatively expensive. In addition, air bags are practical only when filling small voids. For example, if a trailer is only loaded to two-thirds capacity, the number of air bags needed to fill the trailer would be great. The expense and time needed to fill one-third of a trailer with air bags is prohibitive.

Another product used to secure cargo is shown in the Ty-Gard brochure "Freight Restraint System". A double-sided adhesive tape is placed onto sidewalls of a trailer. Strips of flexible industrial fiber are then stuck to the tape and wrapped around the cargo. The two free ends of the flexible strips are then secured together, using a steel tool. This wrapping mechanism can be expensive, and very time-consuming to install.

Movable shipping bulkheads can be used to limit disturbance of the items being transported. Bulkheads of this type are shown in U.S. Pat. Nos. 4,080,906 to Brown and 4,880,342 to Pradovic. Although effective, these devices have limitations. Bulkheads may require a channel be permanently affixed to the trailer, to allow the panels to be moved. This reduces the usable space available in the trailer. Furthermore, these devices can be large, heavy and cumbersome to use. They can be expensive, and can be used only in specific applications. For example, these bulkheads cannot be easily removed from a semitrailer and used in railroad cars or other vehicles. A smaller, portable load restraint mechanism would address many of these problems.

Portable loading braces are shown in U.S. Pat. Nos. 969,002 to Teachout, 2,766,704 to McMahon, and 2,912,939 to Miner, Jr. et al. Generally, all of these braces include a rigid member which is secured to opposing sidewalls of a trailer. These braces can be placed at any vertical height within the trailer, and thus restrict shifting of the cargo where it is most likely to occur.

The above-cited references each disclose a different means of attaching a rigid member to the sidewalls. The '002 reference includes two telescoping members, which are adjustable using an internal, threaded screw. The two members are expanded until they form a tight friction-fit against the sidewalls. The '704 patent also uses a friction-fit to secure the brace to the trailer. However, this device uses pivotable arms to wedge the brace against the sidewalls. The Miner reference discloses the use of guides which are attached to opposite ends of the rigid member. The guides have fingers thereon, which are adapted to fit into plates secured to the trailer sidewalls.

All of these load braces may be effective at limiting load shifting. They can be installed at various locations within the trailer, at varying heights, to restrict movement of the freight. However, these items can be expensive, and difficult to use. The '939 patent requires the use of tools to attach the guides to the rigid member, and the plates to the vehicle.

An improved portable load brace would be inexpensive and easy to install. The mechanism would also be relatively lightweight. The blocking member would be an item commonly found, and the remainder of the mechanism would be disposable. The brace would require no tools to install and would leave no permanent marks on the vehicle. The load restraint would be readily available at all shipping centers, and thus the person loading the trailer would not need to keep and maintain any one brace. After delivering the freight, the brace could be disposed. In fact, portions of the brace could be recycled and reused.

Accordingly, it is an object of the present invention to provide a cargo load-lock which is relatively lightweight and portable.

Another object of the present invention is to provide a cargo load-lock that can be used at various locations within a trailer.

A further object of the present invention is to provide a cargo load-lock which utilizes an ordinary 2×4 as its rigid member.

Still another object of the present invention is to provide a cargo load-lock which requires no tools to install.

A still further object of the present invention is to provide a cargo load-lock which includes a brace which is disposable and recyclable.

Yet another object of the present invention is to provide a cargo load-lock which can be used in compartments of various widths.

These and other objects of the present invention are attained in a cargo load-lock having a pair of oppositely disposed braces and a blocking member extending therebetween. In the first preferred embodiment shown, each brace includes a generally flat, rectangular base and a sleeve extending transversely from the base. The sleeve is a hollow member, and can be of any cross-sectional configuration. Preferably, the sleeve has a generally rectangular cross-section to correspond with the cross-section of the blocking member. In the first preferred embodiment, it is preferred that the blocking member be an ordinary 2×4. However, any relatively rigid, commonly available structural member could be used.

Within the sleeve, along the front surface of the base, are a plurality of raised ribs. These ribs strengthen and support the sleeve. The sleeve also includes at least one line of perforation thereon. Preferably, the sleeve includes two perforations extending longitudinally along opposite sides at the top of the sleeve, and a third perforation connecting the first two perforations near the base. The perforations allow the top of the sleeve to be pried open, allowing the user to remove the 2×4 from the sleeve.

The 2×4 is cut to a length slightly shorter than the width of the vehicle compartment, and a brace is placed on either end of the 2×4. The 2×4 is received by each sleeve, allowing for some longitudinal shifting of the 2×4 within the sleeve. The two braces are then attached in the desired locations to opposing sidewalls. This is accomplished by peeling a protective strip from the back of the base, and exposing an adhesive. The adhesive bonds the base to the vehicle sidewall. To provide further support, the base includes a cross-hatch network of ribs therein. The base also includes a handle, allowing the user to peel the base from the sidewall before unloading the cargo. It is contemplated that the braces could be formed from any plastic material. In the preferred embodiments shown, the braces are made of ABS plastic, and are disposable and recyclable.

In a second preferred embodiment, the blocking member need not be rigid. In fact, it is preferred that the blocking member be a flexible, durable strap. In this preferred embodiment, the braces do not include the sleeves. Two braces are attached to opposite trailer sidewalls. Then, the flexible strap is tied between the handles on the opposing braces. The flexible strap prevents the cargo from shifting.

Other objects, advantages and novel features of the present invention will become apparent in the following detailed description of the invention when considered in conjunction with the accompanying drawings.

DESCRIPTION OF THE PREFERRED EMBODIMENTS

Figure 1:
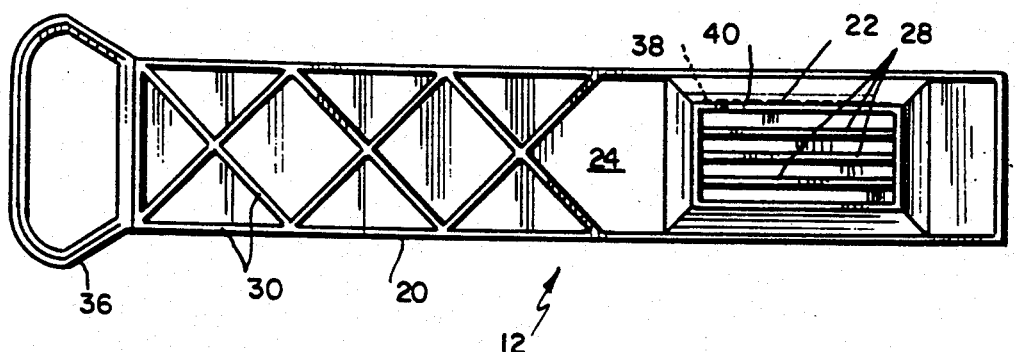
FIG. 1 is a front view of a cargo load-lock mounting brace in accordance with the present invention.
Figure 2:
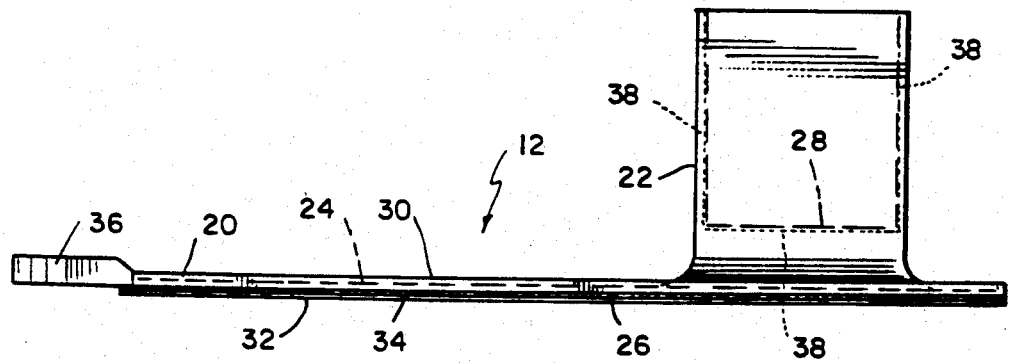
FIG. 2 is a side view of the cargo load-lock mounting brace shown FIG. 1 in accordance with the present invention.
Figure 3:
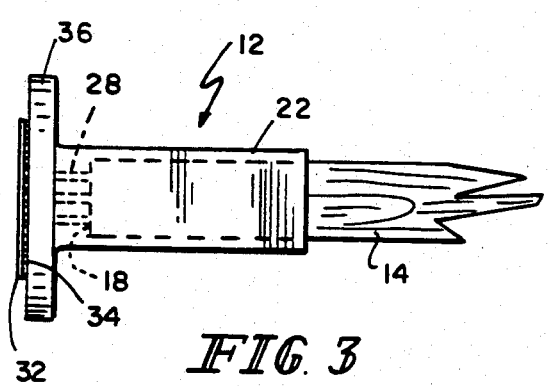
FIG. 3 is a top view of a cargo load-lock mounting brace and blocking member in accordance with the present invention.
Figure 4:
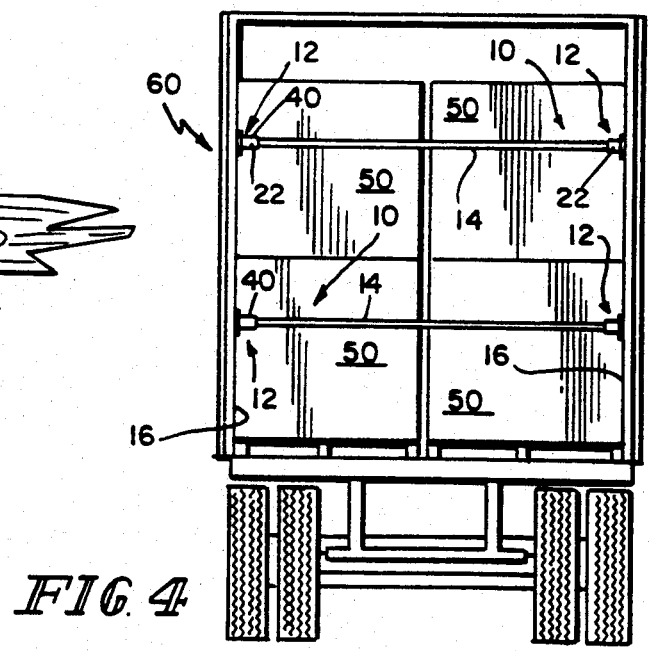
FIG. 4 is a back view of a semi-trailer, utilizing a pair of cargo load-locks in accordance with the present invention.

Referring now to the drawings, in which like-referenced characters indicate corresponding elements throughout the several views, attention is first directed to FIGS. 1 through 7 which generally illustrate preferred embodiments of a cargo load-lock according to the present invention, indicated generally as 10. Cargo load-lock 10 comprises at least one, and preferably two, mounting braces 12 and a blocking member 14. Cargo load-lock 10 is designed to restrict the shifting of freight 50 being shipped in a trailer or similar vehicle 60 having opposing sidewalls 16. When used with such a vehicle 60, a mounting brace 12 is attached to each opposing sidewall 16. Blocking member 14 is then attached to the two mounting braces 12. Blocking member 14 abuts freight 50 in the trailer, and prevents it from shifting. In some circumstances, it may be possible to use cargo load-lock 10 with a single mounting brace 12. One end 18 of blocking member 14 would be wedged against sidewall 16, and opposite end 18 would be received by the single mounting brace 12.

In the first preferred embodiment shown in FIG. 1, each mounting brace 12 includes base 20 and sleeve 22. Base 20 is preferably of a generally flat, rectangular shape. Base 20 includes front surface 24 and back surface 26. Extending from front surface 24, transverse to base 20, is sleeve 22. Sleeve 22 is preferably hollow and can be of most any cross-sectional configuration. In the preferred embodiments shown, sleeve 22 has a generally rectangular cross-section. As it is sleeve 22 which receives blocking member 14, it is preferred that sleeve 22 and blocking member 14 have similar cross-sectional configurations. Mounting brace 12 can be made from any plastic. However, base 20 and sleeve 22 are both preferably formed from ABS plastic. Thus, mounting brace 12 is disposable. Furthermore, mounting brace 12 is recyclable, reducing waste and improving ecological conditions. In addition, blocking member 14 can be reused, thus adding to the conservational qualities of this device.

Also on front surface 24 of base 20 are a plurality of ribs 28. Within sleeve 22, base 20 includes ribs 28 extending generally parallel to the longitudinal axis of base 20. Ribs 28 strengthen and support sleeve 22 against the forces applied by blocking member 14. Front surface 24 of base 20 also includes cross-hatch rib network 30 therein. Rib network 30 strengthens base 20 against the shear forces applied to mounting brace 12. Rib network 30 also limits warping of base 20.

Each mounting brace 12 is designed to be attached directly to sidewall 16 of the vehicle compartment. In the first preferred embodiment shown, base 20 includes cover strip 32 which covers at least a portion of back surface 26. Cover strip 32 can be peeled away to expose adhesive 34. Adhesive 34 covers at least a portion of back surface 26 of base 20. Adhesive 34 is a bonding agent which removably bonds mounting brace 12 to sidewall 16. Any number of compositions can be used as adhesive 34. However, adhesive 34 should provide resistance to shear forces, but allow mounting brace 12 to be peeled off of sidewall 16. Butyle based, acrylic based and rubber based adhesives are effective bonding agents. Butyl based adhesives work well as an adhesive when mounting brace 12 is attached to a sidewall 16 made of steel, but are not as effective as a bonding agent when sidewall 16 is wooden. Acrylic based adhesives are more effective when used with wood than with steel. All of these compositions may be strengthened by applying an additional bonding solution to sidewall 16. For example, by applying a spray adhesive to sidewall 16 prior to affixing mounting brace 12, the resulting bond will be stronger. The most preferred spray adhesive is Super 77 Spray Adhesive, produced by 3M. To further enhance the bond between mounting brace 12 and sidewall 16, it may be beneficial to prepare sidewall 16 with a cleaning solvent.

While the bond between mounting brace 12 and sidewall 16 should be strong, it is important that mounting brace 12 be removable from sidewall 16. Thus, adhesive 34 should form a strong bond against the shear forces applied to base 20, but should also allow mounting brace 12 to be peeled from sidewall 16 once the freight has been delivered.

There are many advantages to using adhesive 34 to secure mounting brace 12 to sidewall 16. Mounting brace 12 can quickly and easily be positioned anywhere within the trailer. No channels or rails are needed. Furthermore, no tools are required. Mounting brace 12 is installed simply by removing cover strip 32 and pressing base 20 against sidewall 16. To remove mounting brace 12, it is simply peeled away. Mounting brace 12 preferably includes handle 36 to facilitate this removal.

Blocking member 14 is telescopically received by opposing sleeves 22 on opposing mounting braces 12. Blocking member 14 spans substantially the entire width of the trailer, and acts as a physical barrier, preventing the shifting or disturbance of freight 50. Blocking member 14 can be any rigid structure, but it is preferred that blocking member 14 be an ordinary 2×4. A 2×4 is readily available at many locations and can easily be cut to fit a particular trailer. In addition, a 2×4 is inexpensive. It can be reused or discarded once the cargo has been delivered.

The ease with which cargo load-lock 10 can be attached and removed should now be readily apparent. Blocking member 14 is chosen, and is preferably a few inches shorter in length than the width of the compartment. It is preferred that blocking member 14 be an ordinary 2×4. This allows the user to obtain blocking member 14 at many locations. Also, a 2×4 can easily be cut to fit the particular compartment. However, blocking member 14 may be any rigid structure. Once blocking member 14 is obtained, a mounting brace 12 is placed on its opposite ends 18. Each end 18 is received by sleeve 22. Sleeve 22 is positioned such that end 18 abuts ribs 28. This allows ample clearance of cargo load-lock 10 into the trailer.

Covered strips 32 are peeled away, and base 20 is pressed against sidewall 16 at the desired location. Preferably, mounting brace 12 is placed in a generally horizontal position. When sidewall 16 includes vertical ribs thereon, it may be preferable to position mounting brace 12 vertically. In either position, it is preferred that blocking member 14 be mounted so as to provide maximum strength against horizontal motion. When using a 2×4, this would include positioning the board such that the short side faces the load.

Once mounting braces 12 are in position, cargo load-lock 10 effectively limits the shifting of freight 50 during shipping. Before unloading the cargo, cargo load-lock 10 should be removed. First, blocking member 14 is removed. In the first preferred embodiment shown, sleeve 22 includes at least one perforation 38. It is preferred that sleeve 22 include two perforations 38, extending longitudinally at opposite sides of top surface 40 of sleeve 22 and a third perforation 38 connecting the first two perforations 38 near base 20. Top 40 of sleeve 22 can be pried open by wedging a screwdriver or similar article between top 40 and blocking member 14. Perforations 38 allow top 40 to be easily pried open. Once top 40 is removed, blocking member 14 can be lifted from sleeve 22.

Once rigid blocking member 14 is removed from sleeve 22, mounting brace 12 can be peeled from sidewall 16. Handle 36 is grasped and pulled away from sidewall 16. Adhesive 34, while resisting shear forces, does not prevent mounting brace 12 from being peeled off of sidewall 16. Mounting brace 12 can then be disposed. Shipping centers can collect discarded mounting braces 12 to be recycled.

Figure 5:
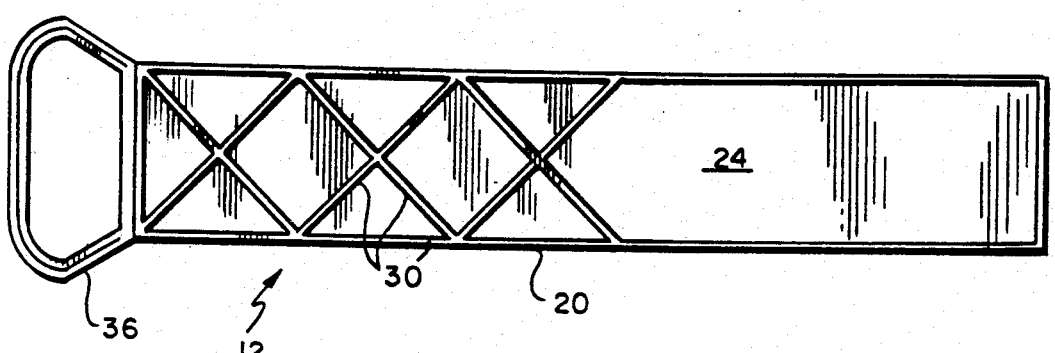
FIG. 5 is a front view of a second preferred embodiment of a cargo load-lock mounting brace in accordance with the present invention.
Figure 6:
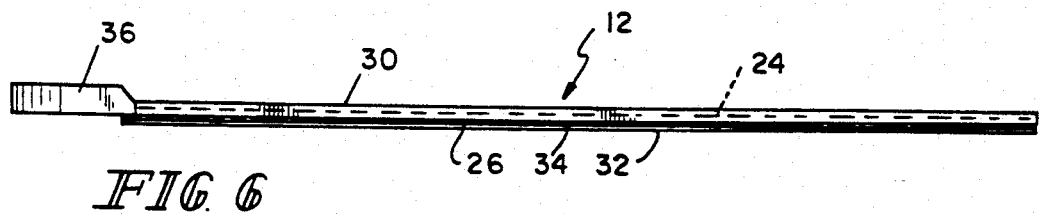
FIG. 6 is a side view of a second preferred embodiment of a cargo load-lock mounting brace in accordance with the present invention.
Figure 7:
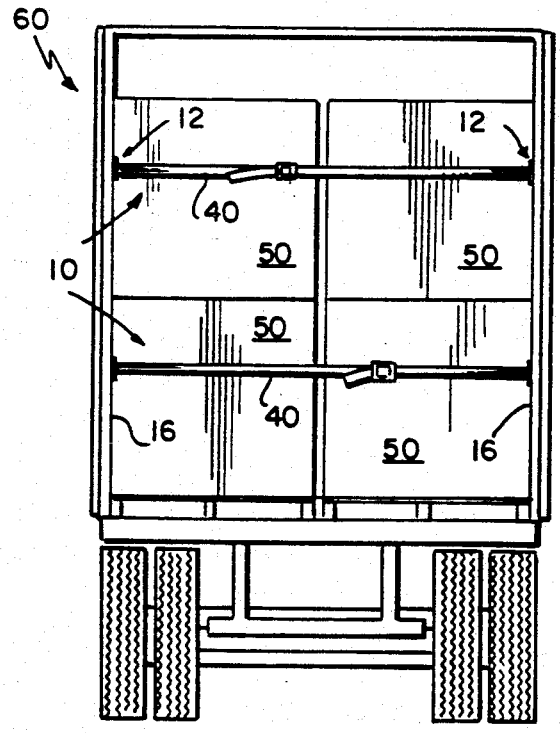
FIG. 7 is a back view of a semi-trailer utilizing a second preferred embodiment of a cargo load-lock in accordance with the present invention.

In a second preferred embodiment, shown in FIGS. 5 through 7, mounting brace 12 does not include a sleeve. In this embodiment, handle 36 acts as the receptacle for blocking member 14. Two mounting braces 12 are attached at desired locations to opposing sidewalls 16. Again, adhesive 34 is the preferred means of attachment. After mounting braces 12 are in place, blocking member 14 is attached to the braces. In this embodiment, it is preferred that blocking member 14 be a durable, flexible material. Blocking member 14 is laced through opposing handles 36, and the loose ends are secured together. Flexible blocking member 14 acts as the barrier which prevents longitudinal movement of freight 50.

From the preceding description of the preferred embodiments, it is evident that the objects of the invention are attained by the present invention. Although this invention has been described and illustrated in detail, it is to be clearly understood the same is by way of illustration and example only and is not to be taken by way of limitation. Therefore, the spirit and scope of this invention are to be limited only by the terms of the appended claims.

What is claimed:

1. A load restraint system for use in a compartment having oppositely disposed sidewalls, comprising:
   a rigid blocking member;
   at least one frame independent of said rigid blocking member for mounting onto one of said oppositely disposed sidewalls;
   said at least one frame having a base portion and a sleeve portion for telescopically receiving at least a portion of said rigid blocking member;
   mounting means for removably mounting said at least one frame onto one of said oppositely disposed sidewalls;
   wherein said base portion of said at least one frame has a back surface and said mounting means includes an adhesive substance on said back surface of said base portion of said at least one frame;
   wherein said sleeve portion of said at least one frame includes removal means for removing said rigid blocking member from said sleeve portion while said at least one frame is mounted onto one of said oppositely disposed sidewalls; and wherein said removal means includes at least one line of perforations in said sleeve portion of said at least one frame.

2. The load restraining systems according to claim 1, wherein said removal means includes three lines of perforations in a generally U-shaped configuration in said sleeve portion of said at least one frame.

3. The load restraint system according to claim 2, wherein said base portion of said at least one frame includes gripping means for gripping said at least one frame when removing said at least one frame from one of said oppositely disposed sidewalls.

4. The load restraint system according to claim 3, wherein said gripping means including a handle integrally formed as a part of said base portion of said at least one frame.

5. The load restraint system according to claim 4, wherein said at least one frame includes support means for resisting tensile and shear forces.

6. The load restraint system according to claim 5, wherein said support means includes at least one rib located on said base portion of said at least one frame within said sleeve portion of said at least one frame.

7. The load restraint system according to claim 6, wherein said base portion of said at least one frame includes an integrally formed rib network for resisting shear forces and warping.

* * * * *